Patented Jan. 30, 1923.

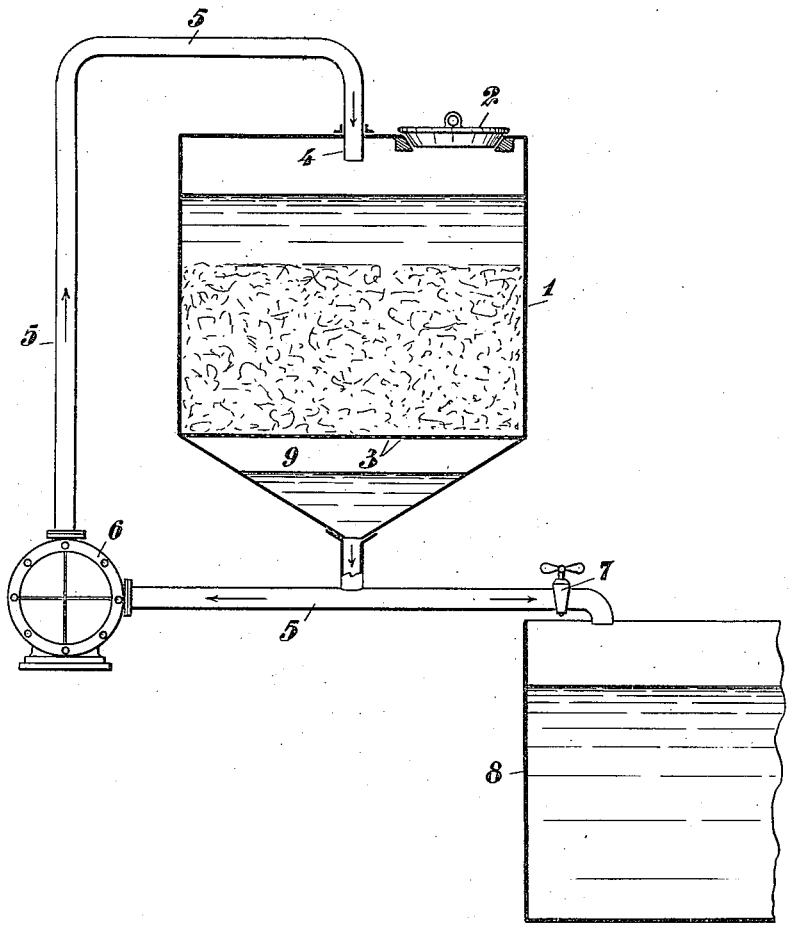

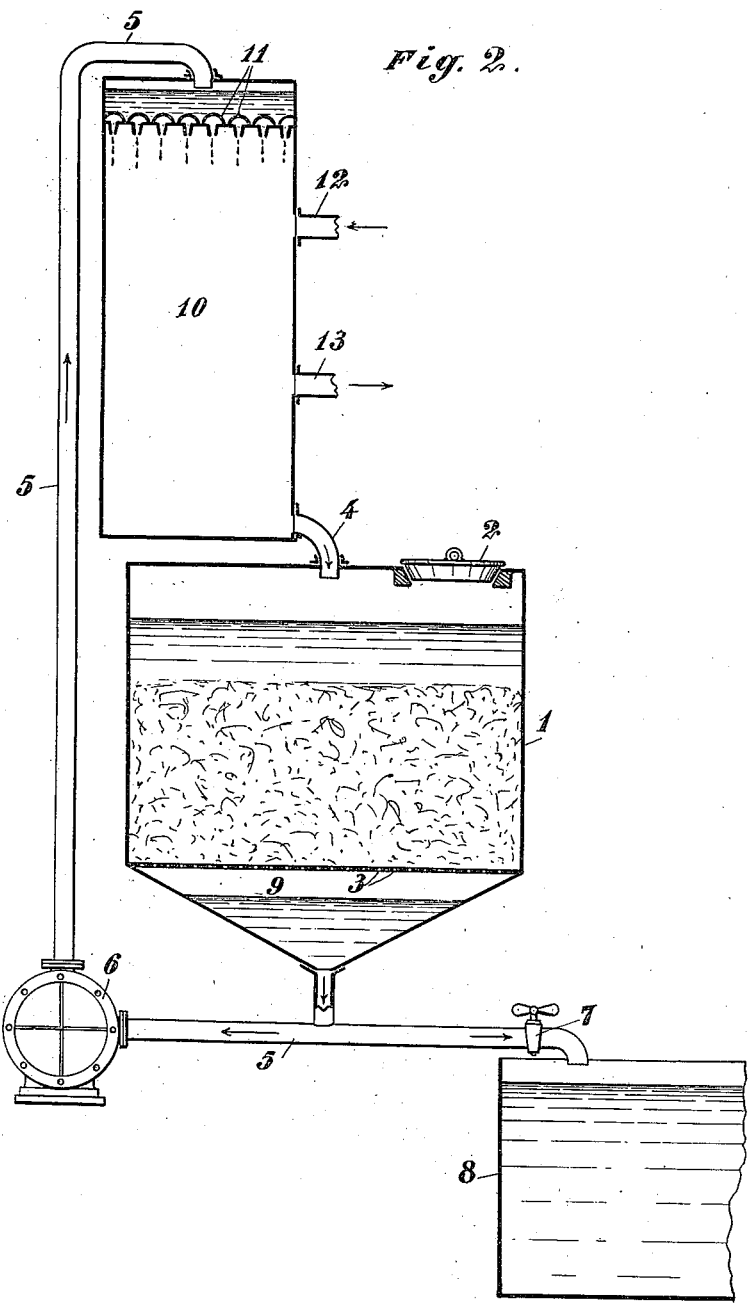

1,443,674

UNITED STATES PATENT OFFICE.

GIAN ALBERTO BLANC, OF ROME, ITALY.

METHOD FOR THE TREATMENT OF SILICATES WITH ACIDS IN ORDER TO OBTAIN SALINE SOLUTIONS FREE FROM SILICA.

Application filed October 19, 1921. Serial No. 508,808.

*To all whom it may concern:*

Be it known that I, GIAN ALBERTO BLANC, a subject of the King of Italy, residing at Rome, in the Kingdom of Italy, have invented certain new and useful Improvements in Methods for the Treatment of Silicates with Acids in Order to Obtain Saline Solutions Free from Silica, of which the following is a full, clear, and exact description.

It is well known that when treating a silicate with an acid in order to solubilize part of its constituents, very great difficulties are met in attempting to effect the separation of the solution from the residual silica contained in same. Said difficulties arise from the fact that the treatment of silicates with acids causes the formation of colloidal silica, which not only constitutes an impurity of the salts that can be obtained from the solution, but by causing in its turn the formation of gels practically prevents filtration.

It is also well known that several methods have been proposed for the elimination of gelatinous silica from said solutions, but it does not appear that any one of them has given satisfactory results on an industrial scale.

The present invention concerns a method for overcoming the above mentioned difficulty thus enabling to obtain industrially solutions completely free from silica in the treatment of silicates with acids.

The method is based on the following two facts which result from practical experiments:

1. There are certain silicates, as for instance leucite, with which when the process of attack is carried out on granulated material (of the order of about 1 mm. size) the solubilization of the salts that are formed (i. e. of the salts of potassium and aluminium in the aforesaid case of leucite) takes place without the silica (which is liberated in the process) passing into solution in the colloidal state, as long at least, as the mass of the granulated material treated is not mechanically disturbed during the process.

In other words, the acid solution determines the formation of the corresponding soluble salts, which pass into solution, while the totality of the corresponding silica remains with the bulk of the insoluble material, without any colloidal silica passing into the liquid.

2. When a saline solution has been obtained by treating a silicate in the above mentioned way, and it happens that for some reason or other (as for instance the presence in the filtering layer of a certain amount of impalpably powdered material, that hardly can be avoided in practice) colloidal silica passes into solution, it will be sufficient to cause said solution to circulate through the mass of the residual siliceous material already attacked, in order to free completely the liquid from any trace of colloidal silica, the latter remaining occluded in the layer of the insoluble material through which the solution is caused to flow.

Now, according to my invention, in order to secure practically the conditions in which the above mentioned phenomena take place, a layer must be formed with the granulated material to be treated, and then the acid solution must be caused to slowly filter through the layer. Thus the acid attacks the silicate forming the corresponding soluble salts, that pass into solution, and leaves the corresponding silica in a state that may be supposed to be like a mass of little crystalline frames of gelatinous silica, which, as long as it is not mechanically disturbed remains permeable to the saline solution but occludes and fixes the colloidal silica that the liquid may have carried in suspension on account of some finely powdered material having been present in the mass attacked.

The filtered solution, restored to its primitive acidity if necessary, is then poured again onto the filtering layer to be attacked in order to eliminate all the residual traces of silica and to complete the extraction of the soluble salts.

This method of circulating the acid solution through the layer of the granulated material during the process of attack prevents any mechanical disturbance of the siliceous filtering layer, which would alter its structure and destroy both its peculiar properties of being permeable to the saline solution and of retaining occluded the colloidal silica.

In the annexed drawing forming part of this specification two embodiments of an apparatus are by way of example diagrammatically illustrated in which my new process may be carried out.

Fig. 1 shows a vertical section of an apparatus designed for the treatment of silicates with acid solutions prepared beforehand.

Fig. 2 shows a vertical section of another apparatus for the treatment of silicates with acids, in which case the liquid is continually brought again to saturation during the process.

The operation proceeds as follows: The granulated leucite, preferably as much as possible exempt from fine powder, is introduced into a receptacle 1, Fig. 1, forming therein a layer of variable thickness according to the size and the shape of the receptacle, the latter being provided at its top with a charging opening 2 and having a perforated bottom 3. The receptacle is also provided on the side with a discharge door for discharging the residual material.

The leucite is then subjected to the action of a conveniently concentrated acid solution flowing from the outlet 4 of a feeding pipe 5.

Any convenient pump or liquid elevator 6 causes the liquid collected in the funnel 9 to circulate in the pipe 5 and to flow repeatedly through the layer of leucite until the complete solubilization of the potash and alumina are obtained, and the solution is completely freed from the silica.

Then the discharge cock 7 is opened, the solution deprived of silica is allowed to flow into a basin 8 and then one proceeds to the separation of the potash and alumina contained in the solution.

It will be understood that by the circulation of the acid solution through the granulated mass of the mineral, the potash and the alumina are gradually dissolved and the colloidal silica carried into the solution remains occluded in and is fixed by the gelatinous silica that has not been dissolved. The experience shows that by prolonging sufficiently the circulation of the acid solution through the layer of residual siliceous material, the solution can be deprived of any trace of colloidal silica and passes perfectly clear and pure.

Fig. 2 shows a modification of the apparatus in which the pipe 5 instead of entering directly the filtering vessel, enters in a saturation tower 10 provided with a gutter 11, an inlet 12 for the admission of a gaseous acid into the tower 10 and with an opening 13 for the outlet of the excess gas after the saturation of the liquid which drips from the gutter 11.

The apparatus works in a manner similar to that of the apparatus illustrated in Fig. 1, with the exception that the gaseous acid arriving from the generator is absorbed by the liquid dripping from the gutter 11, and the solution heat serves to keep the liquid at the ebullition temperature.

In this manner one can dissolve by means of a small quantity of liquid, and within a very short time, the totality of the soluble constituent of the silicate; further the saline solution, deprived of silica, arriving at high temperature in the basin 8 one can recover and separate by a simple cooling process most of the materials it contains.

The above described process is particularly convenient in those cases in which the attack of the mineral is made with hydrochloric or nitric acid, because through the pipe 12 is led the gaseous acid which, in the interior of the tower, saturates the circulating liquid in substitution of that amount of acid that has already combined with the mineral. The method can be applied also in the case in which instead of a gaseous acid, a liquid acid is used, for instance anhydrous sulphuric acid which in the interior of the tower is brought to the desired degree of dilution, thereby heating the solution.

I claim as my invention:

1. Process for obtaining, in the treatment of silicates with acids, saline solutions free from silica, consisting in forming a layer of the granulated silicate to be attacked, through which layer is caused to flow repeatedly a certain quantity of acid liquid, which after each passage is enriched with the dissolved salts and spoiled of a corresponding quantity of acid, the circulation being continued as far as to reach the total consumption of the acid the treated mass being spoiled of its soluble salts, and further the colloidal silica carried in suspension by the liquid being completely left in the layer of insoluble material.

2. Process according to claim 1, in which the acid solution after the passage through the layer of the attacked material is again saturated by adding fresh acid to it for the object of utilizing also the solution or dilution heat, for heating the liquid which serves for attacking the mineral.

In testimony whereof I affix my signature in the presence of two witnesses.

GIAN ALBERTO BLANC.

Witnesses:
LEFTEND LABOUEPPS,
WILHELM SCHMID.